(12) United States Patent
Lee (10) Patent No.: US 7,830,491 B2
(45) Date of Patent: Nov. 9, 2010

(54) SEALANT DISPENSING APPARATUS AND METHOD FOR MANUFACTURING LIQUID CRYSTAL DISPLAY DEVICE USING THE SAME

(75) Inventor: Seung Beum Lee, Daegu-si (KR)

(73) Assignee: LG Display Co., Ltd., Seoul (KR)

( * ) Notice: Subject to any disclaimer, the term of this patent is extended or adjusted under 35 U.S.C. 154(b) by 781 days.

(21) Appl. No.: 11/455,095

(22) Filed: Jun. 19, 2006

(65) Prior Publication Data
US 2007/0121055 A1    May 31, 2007

(30) Foreign Application Priority Data
Nov. 28, 2005    (KR) .................. 10-2005-0114166

(51) Int. Cl.
*G02F 1/1333*    (2006.01)
(52) U.S. Cl. ...................................... 349/153; 349/190
(58) Field of Classification Search .................. 349/153, 349/190
See application file for complete search history.

(56) References Cited

U.S. PATENT DOCUMENTS

| | | | |
|---|---|---|---|
| 3,812,820 A | 5/1974 | Ronneberg | |
| 7,194,952 B2 * | 3/2007 | Naitou et al. | ............... 101/119 |
| 7,572,106 B2 * | 8/2009 | Nagao et al. | .................. 417/53 |
| 2002/0063836 A1 | 5/2002 | Oku et al. | |
| 2003/0231277 A1 * | 12/2003 | Zhang | ........................ 349/187 |

FOREIGN PATENT DOCUMENTS

| | | |
|---|---|---|
| DE | 1115120 | 10/1961 |
| DE | 100 36 756 A1 | 2/2002 |
| EP | 0 880 999 A2 | 12/1998 |
| JP | 06-034981 | 2/1994 |
| JP | 06-34981 | * 2/1994 |
| JP | 7-261160 | 10/1995 |
| KR | 10-2001-0086862 | 9/2001 |

* cited by examiner

*Primary Examiner*—David Nelms
*Assistant Examiner*—Phu Vu
(74) *Attorney, Agent, or Firm*—McKenna Long & Aldridge (57) ABSTRACT

A sealant dispensing apparatus and a method for manufacturing an LCD device using the same is disclosed, to decrease manufacturing time of an LCD device with low manufacturing cost, wherein the sealant dispensing apparatus comprises a roll; a sealant-receiving cavity formed inside the roll; a sealant outlet connected with the sealant-receiving cavity; and a sealant inlet connected with the sealant-receiving cavity.

4 Claims, 8 Drawing Sheets

SEALANT DISPENSING APPARATUS AND METHOD FOR MANUFACTURING LIQUID CRYSTAL DISPLAY DEVICE USING THE SAME

This application claims the benefit of the Korean Patent Application No. P2005-114166, filed on Nov. 28, 2005, which is hereby incorporated by reference for all purposes as if fully set forth herein.

BACKGROUND OF THE INVENTION

1. Field of the Invention

The present invention relates to a liquid crystal display (LCD) device, and more particularly, to a sealant dispensing apparatus of an LCD device.

2. Discussion of the Related Art

Among various ultra-thin flat type display devices, which include a display screen having a thickness of several centimeters, a liquid crystal display (LCD) device can be widely used for notebook computers, monitors, aircraft, and etc. because it has the advantageous characteristics such as low power consumption and portability.

Hereinafter, a related art LCD device will be explained with reference to FIG. 1.

Figure 1:
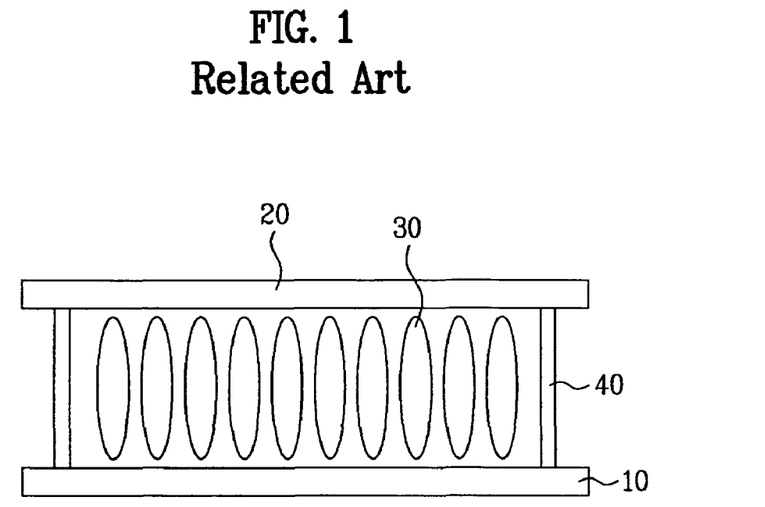
FIG. 1 is a cross sectional view schematically illustrating an LCD device according to the related art.

FIG. 1 is a cross sectional view of schematically illustrating a related art LCD device.

As shown in FIG. 1, the related art LCD device includes lower and upper substrates 10 and 20 facing each other with a predetermined interval therebetween, and a liquid crystal layer 30 formed between the lower and upper substrates 10 and 20.

Although not shown, the lower substrate 10 includes gate and data lines crossing each other to define a pixel region; a thin film transistor formed adjacent to a crossing area of the gate and data lines; and a pixel electrode electrically connected with the thin film transistor. Also, the upper substrate 20 includes a light-shielding layer for shielding the gate line, the data line and the thin film transistor from light, a color filter layer formed on the light-shielding layer, and a common electrode formed on the color filter layer.

An alignment layer may be formed on any one or both of the lower and upper substrates 10 and 20. The lower substrate 10 is bonded to the upper substrate 20 by a sealant 40. The liquid crystal layer 30 is formed between the bonded lower and upper substrates 10 and 20.

Methods for forming the sealant 40 are classified into a screen-mask printing method and a sealant dispensing method.

Hereinafter, a screen-mask printing method and a sealant dispensing method according to the related art will be explained with reference to the following drawings.

Figure 2:
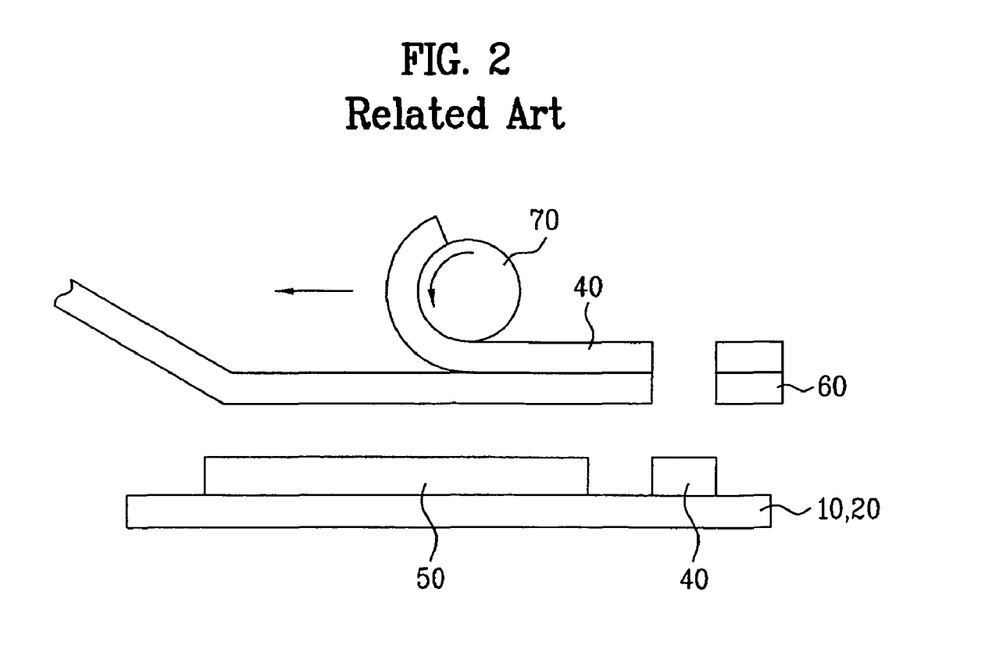
FIG. 2 is a cross sectional view of illustrating a sealant dispensing process using a screen-mask printing method according to the related art.

FIG. 2 is a cross sectional view of illustrating a sealant dispensing process using a screen-mask printing method according to the related art.

First, as illustrated in FIG. 2, a screen mask 60 of a predetermined pattern is positioned above substrates 10 and 20 having an alignment layer 50 formed thereon. After that, a printing roller 70 coated with a sealant 40 is rolled on the screen mask 60, whereby the sealant 40 is coated on the screen mask 60 of the predetermined pattern through gaps 60a in the screen mask 60. That is, the sealant 40 of the predetermined pattern is coated on at least one of the substrates 10 and 20.

However, since the screen-mask printing method necessarily uses a high-priced mask, the manufacturing cost increases.

Also, the screen mask may contact the alignment layer, whereby it may cause damage to the alignment layer.

Figure 3:
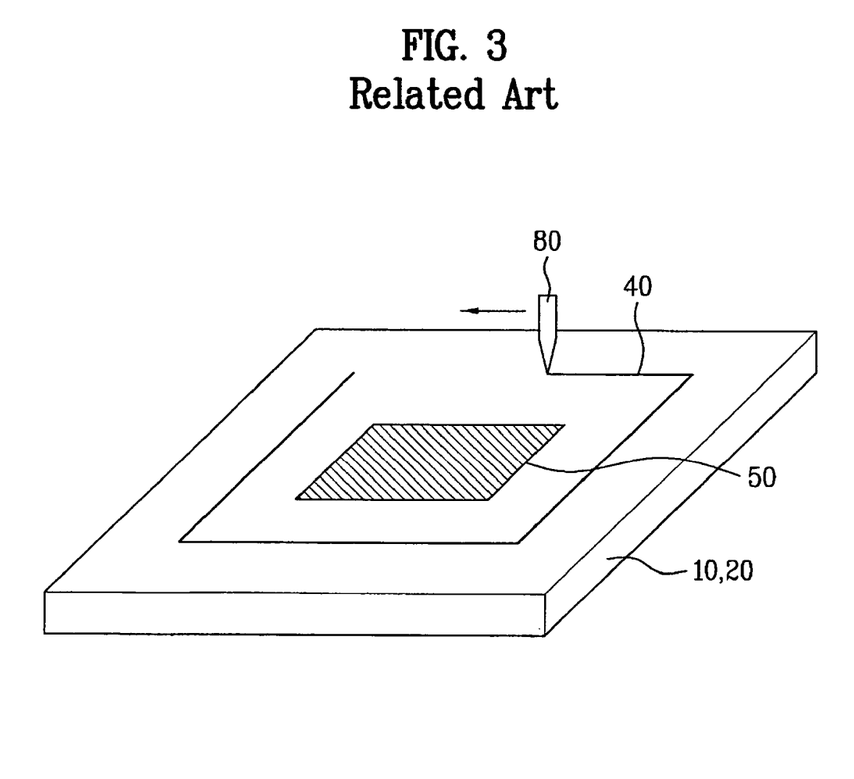
FIG. 3 is a cross sectional view of illustrating a sealant dispensing process using a sealant dispensing method according to the related art.

FIG. 3 is a cross sectional view of illustrating a sealant dispensing process using a sealant dispensing method according to the related art.

As illustrated in FIG. 3, a sealant 40 is dispensed on a predetermined portion of a lower substrate 10 or an upper substrate 20 by a sealant dispenser 80. In this case, the process time is long so that the yield is relatively decreased.

SUMMARY OF THE INVENTION

Accordingly, the present invention is directed to a sealant dispensing apparatus and a method for manufacturing an LCD device using the same, which substantially obviates one or more problems due to limitations and disadvantages of the related art.

An advantage of the present invention is to provide a sealant dispensing apparatus to decrease manufacturing time of an LCD device with low manufacturing cost., Another advantage of the present invention is to provide a method for manufacturing an LCD device using the sealant dispensing apparatus.

Additional advantages and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these and other advantages and in accordance with the purpose of the invention, as embodied and broadly described herein, a sealant dispensing apparatus comprises a roll; a sealant-receiving cavity formed inside the roll; a sealant outlet connected with the sealant-receiving cavity; and a sealant inlet connected with the sealant-receiving cavity.

In another aspect, a method for manufacturing an LCD device comprises preparing first and second substrates; dispensing sealant to any one of the first and second substrates; and dispensing liquid crystal to any one of the first and second substrates, wherein dispensing the sealant to any one of the first and second substrates uses a sealant dispensing apparatus comprising a roll, a sealant receiving cavity inside the roll, a sealant outlet connected with the sealant receiving cavity and a sealant inlet connected with the sealant receiving cavity.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the embodiments of the present invention, examples of which are illustrated in the accompanying drawings. Wherever possible, the same reference numbers will be used throughout the drawings to refer to the same or like parts.

Hereinafter, a sealant dispensing apparatus according to the present invention and a method for manufacturing an LCD device using the same will be explained with reference to the accompanying drawings.

Figure 4A:
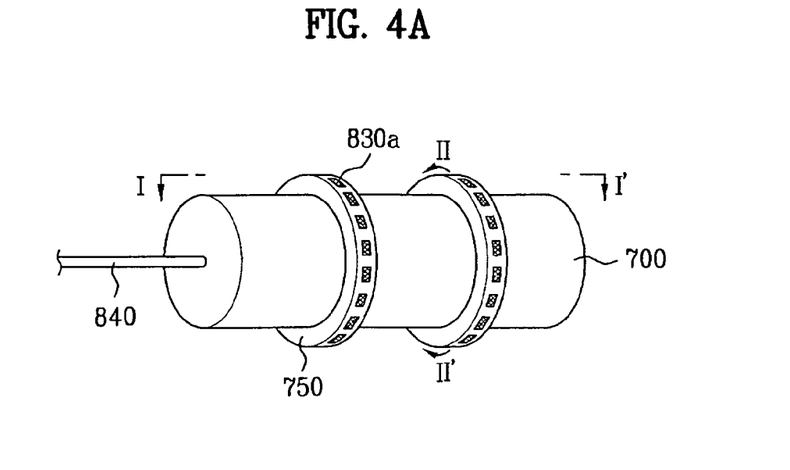
FIGS. 4A and 4B are perspective views schematically illustrating a sealant dispensing apparatus according to an embodiment of the present invention.
Figure 4B:
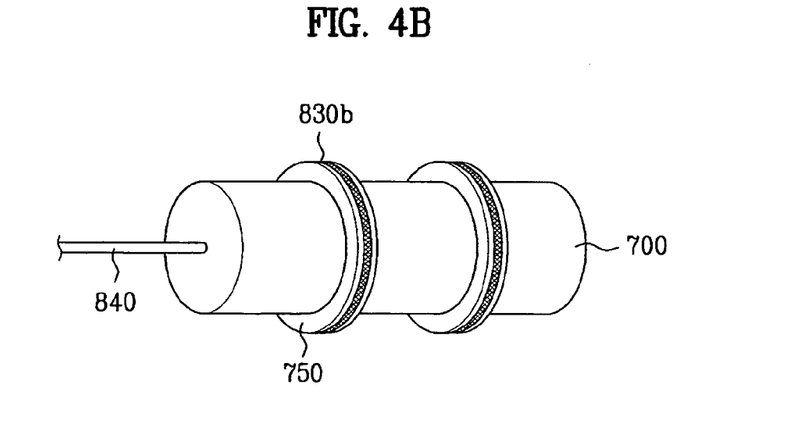
Figure 4C:
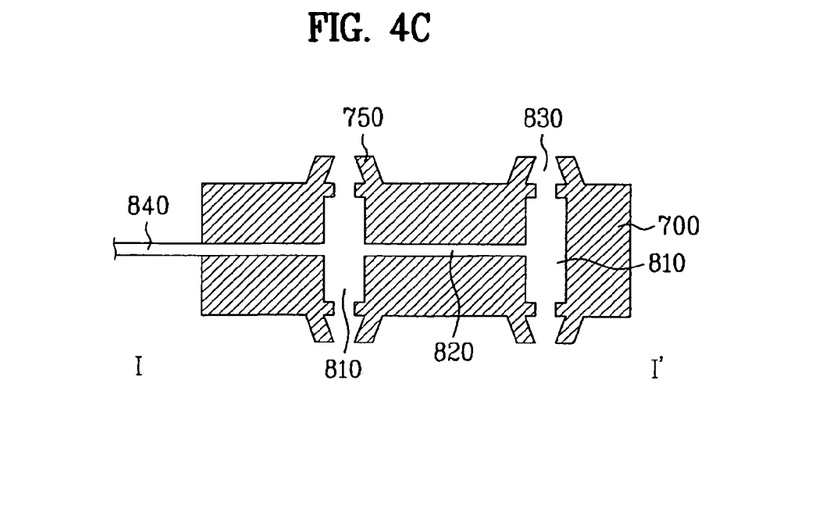
FIG. 4C is a cross sectional view along I-I' of FIG. 4A.
Figure 4D:
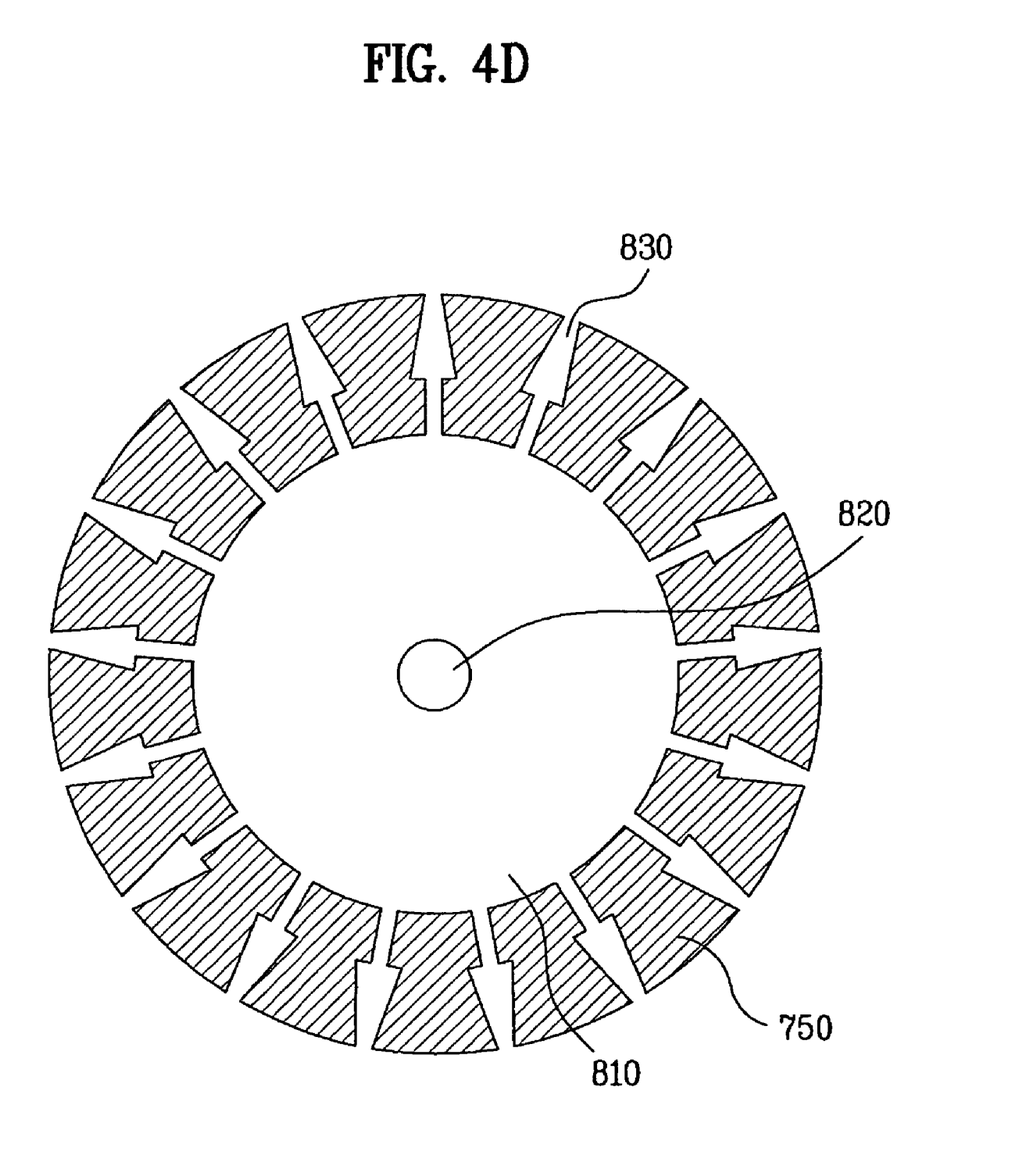
FIG. 4D is a cross sectional view along II-II' of FIG. 4A.

FIGS. 4A and 4B are perspective views schematically illustrating a sealant dispensing apparatus according to a first embodiment of the present invention. FIG. 4C is a cross sectional view along I-I' of FIG. 4A. FIG. 4D is a cross sectional view along II-II' of FIG. 4A.

As illustrated in FIGS. 4A to 4D, the sealant dispensing apparatus according to the present invention includes a roll 700; sealant-receiving cavities 810 and 820 formed inside the roll 700; a sealant outlet 830 connected with the sealant-receiving cavities 810 and 820; and a sealant inlet 840 connected with the sealant-receiving cavities 810 and 820.

As illustrated in FIG. 4C, the sealant-receiving cavities includes the first sealant-receiving cavity 810 and the second sealant-receiving cavity 820, wherein the first sealant-receiving cavity 810 is connected with the sealant outlet 830, and the second sealant-receiving cavity 820 is connected with the sealant inlet 840.

At illustrated in FIG. 4C, the two of the first sealant-receiving cavities 810 may be provided. If providing the two of the first sealant-receiving cavities 810 connected with the sealant outlet 830, the sealant can be dispensed through the two of the first sealant-receiving cavities 810, so that it is possible to decrease the process time.

As illustrated in FIGS. 4A to 4C, the sealant outlet 830 may be formed inside a projection 750, which may be formed on an outer surface of the roll 700, thereby preventing the contact with an alignment layer. Unlike a screen-mask printing method, the alignment layer is maintained with minimal or no damage.

Also, the sealant outlet 830 may be formed along the circumference of the roll 700. As illustrated in FIG. 4A, the sealant outlet 830 may be formed by discontinuous openings. As illustrated in FIG. 4B, the sealant outlet 830 may be formed by a continuous opening.

The sealant outlet 830 formed by the discontinuous openings may be exposed to the projection 750 formed on the surface of the roll 700 being in shape of circle or polygon.

As illustrated in FIGS. 4A to 4C, the sealant inlet 840 may be formed in an axis direction of the roll 700, wherein the sealant inlet 840 is connected with the second sealant-receiving cavity 820 formed inside the roll 700.

An operation of the sealant dispensing apparatus will be explained as follows.

First, as the sealant 400 is provided through the sealant inlet 840, the sealant is stored in the sealant-receiving cavities 810 and 820.

As a pressure is applied to the sealant inlet 840 by air or sealant, the sealant is discharged through the sealant outlet 830. Accordingly, the roll 700 is rolled on or over a substrate, whereby the sealant is dispensed on the substrate.

FIGS. 5A to 5E are cross sectional views illustrating a method for manufacturing an LCD device using a sealant dispensing apparatus according to the present invention.

Figure 5A:
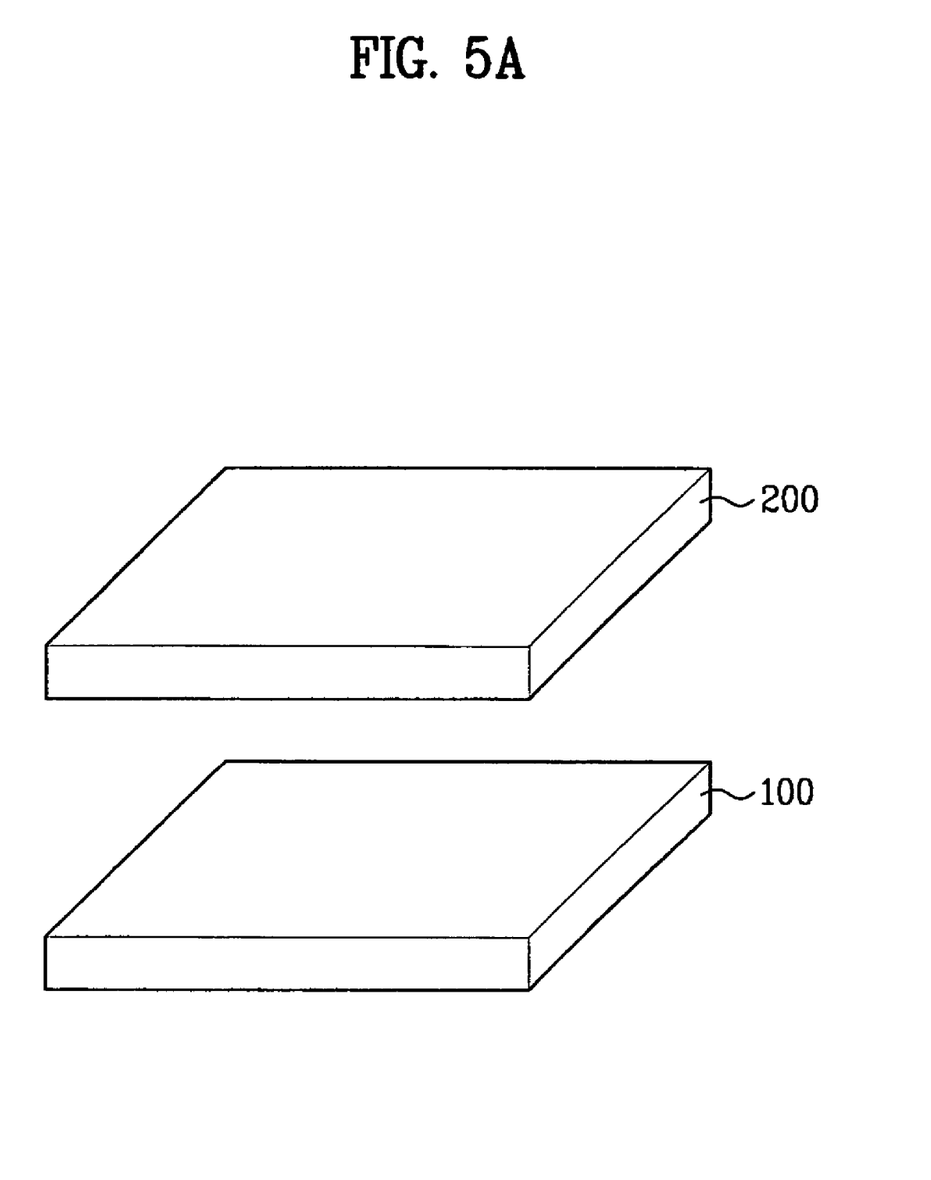
FIGS. 5A to 5E are cross sectional views illustrating a method for manufacturing an LCD device using a sealant dispensing apparatus according to the present invention.

First, as illustrated in FIG. 5A, first and second substrates 100 and 200 are prepared.

Although not shown, the first substrate 100 includes gate and data lines crossing each other to define a pixel region; a thin film transistor formed adjacent to a crossing area of the gate and data lines and connected with a pixel electrode. In an in-plane switching (IPS) mode LCD, a common electrode is formed substantially in parallel to the pixel electrode to generate a transverse electric field.

Although not shown, the second substrate 200 may include a light-shielding layer for shielding the gate line, the data line, and the thin film transistor from the light; and a color filter layer formed on the light-shielding layer.

Although not shown, an alignment layer may be formed on at least one of the first and second substrates 100 and 200.

Figure 5B:
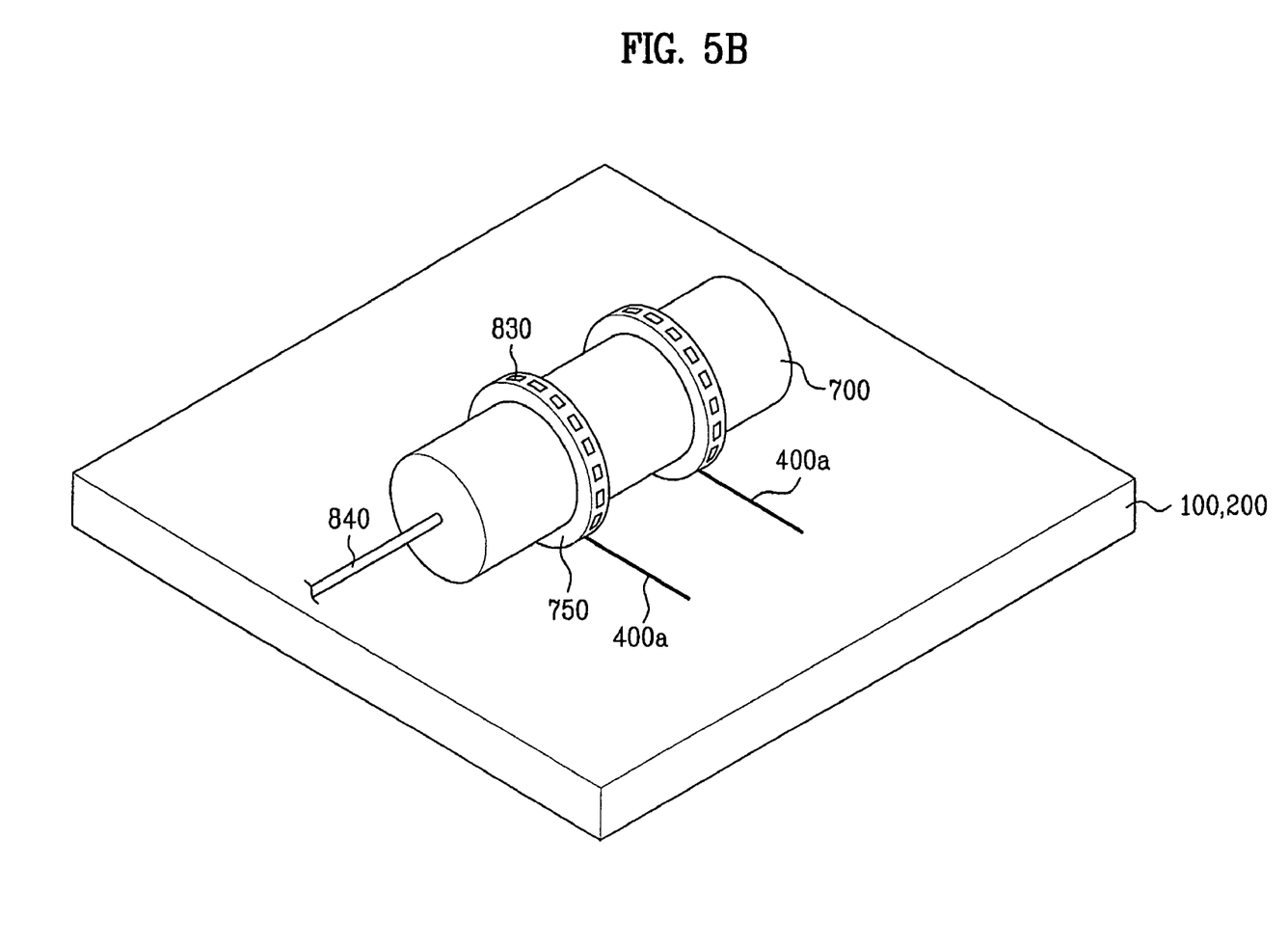

Then, as illustrated in FIG. 5B, a sealant 400a is dispensed to one of the first and second substrates 100 and 200. At this time, the sealant dispensing process uses the above-explained sealant dispensing apparatus.

The sealant dispensing process includes steps of providing the sealant 400 to the sealant dispensing apparatus; rolling the roll 700 on the first or second substrate 100 or 200; and discharging the sealant 400 through the sealant outlet 830 by applying the pressure to the sealant inlet 840 by air or sealant.

Figure 5C:
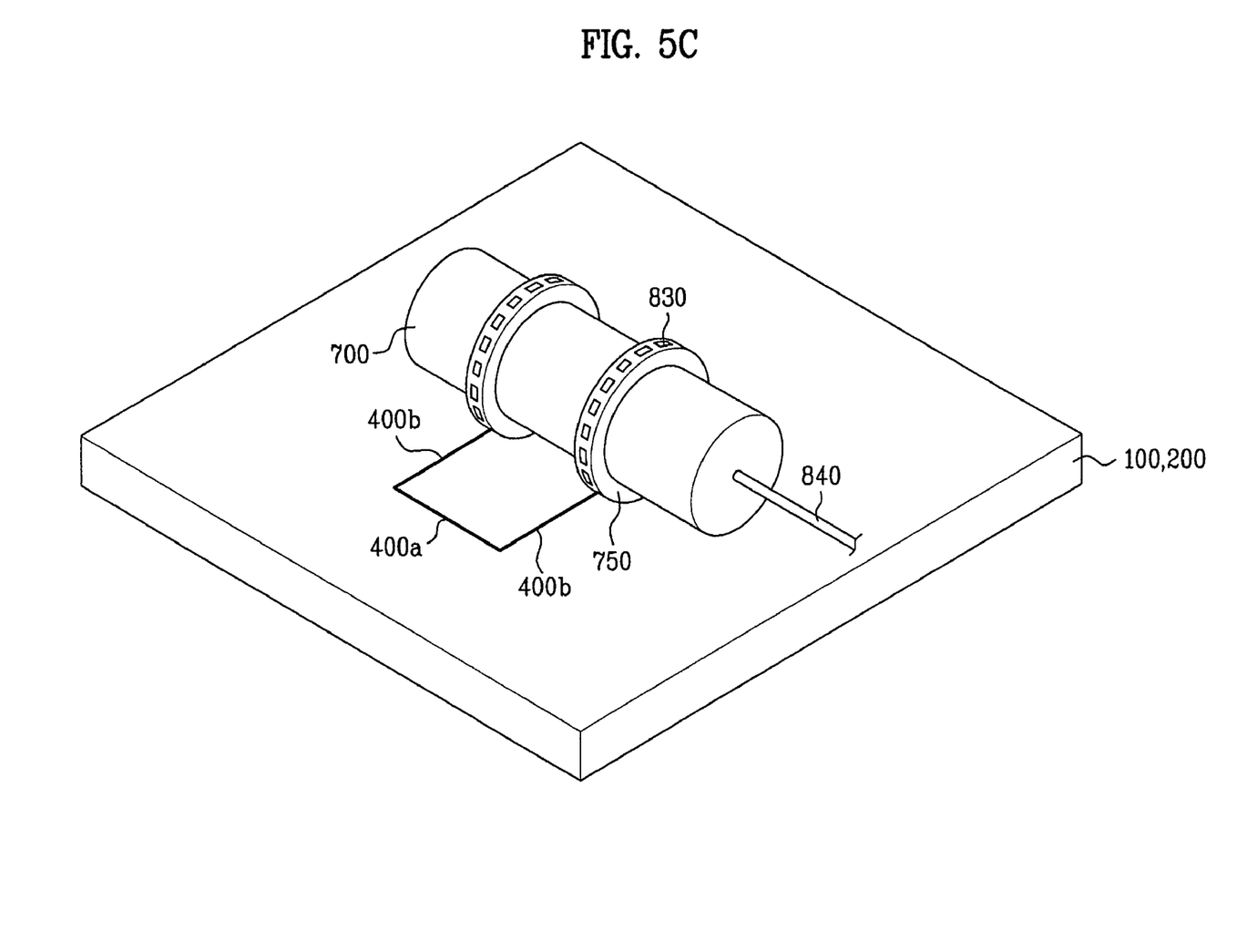

After that, as illustrated in FIG. 5C, a sealant 400b is dispensed substantially perpendicular to the sealant 400a previously dispensed on the substrate. In this case, the sealant dispensing process uses the above-explained sealant dispensing apparatus.

Figure 5D:
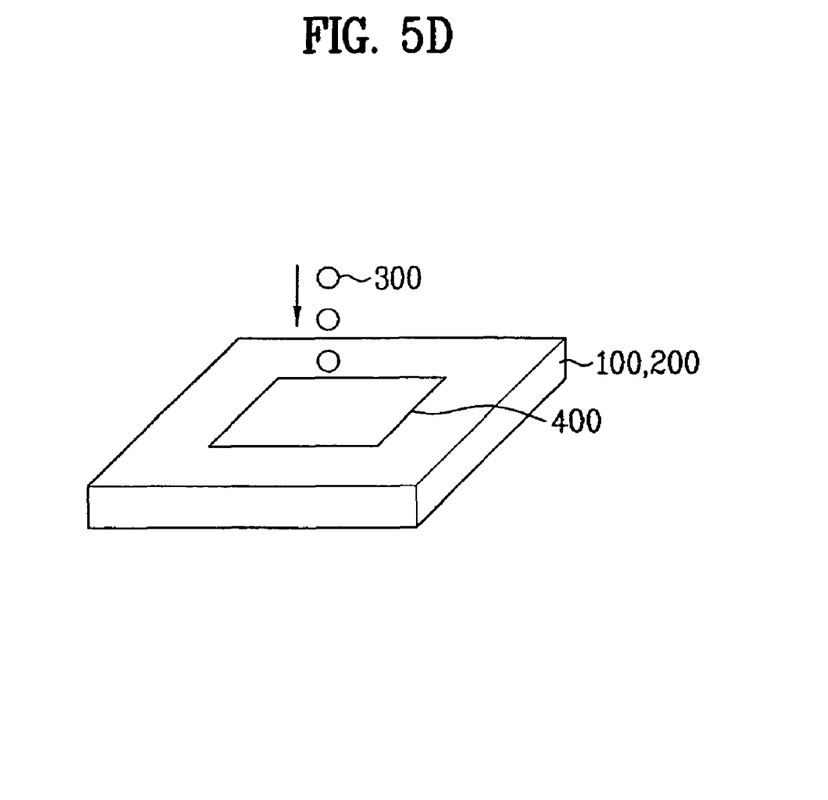

After that, as illustrated in FIG. 5D, liquid crystal 300 is dispensed on the first or second substrate 100 or 200.

Figure 5E:
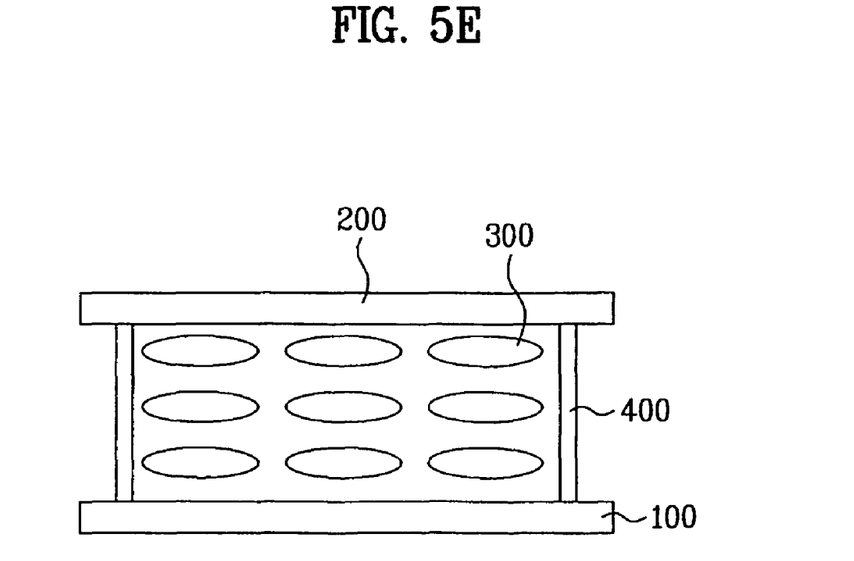

After that, as illustrated in FIG. 5E, the first and second substrates 100 and 200 are bonded to each other.

The sealant dispensing apparatus of the present invention may have a variety of configuration, including additional sealant outlets for dispensing dummy or auxiliary sealant patterns. As mentioned above, the sealant dispensing apparatus according to the present invention and the method for manufacturing the LCD device using the same has the following advantages.

To dispense the sealant on the substrate, the roll having the sealant dispenser is used. Thus, it is unnecessary to use the high-priced screen mask. When manufacturing the LCD device by the sealant dispensing apparatus, it is possible to decrease the manufacturing cost.

Also, the sealant outlet is formed inside the projection formed on the surface of the roll. Accordingly, it is possible to prevent the contact with the alignment layer, thereby preventing the damage of alignment layer.

By using the roll, the sealant dispensing time is decreased so the yield is improved.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method for manufacturing an LCD device comprising:
    preparing first and second substrates;
    dispensing sealant to any one of the first and second substrates; and
    dispensing liquid crystal to any one of the first and second substrates,
    wherein dispensing the sealant to any one of the first and second substrates by using a sealant dispensing apparatus,
    wherein the sealant dispensing apparatus comprises a roll having two projections which are formed on an outer surface of the roll, a sealant receiving cavity formed inside the roll, two sealant outlets connected with the sealant receiving cavity and a sealant inlet connected with the sealant receiving cavity,
    wherein the two projections are spaced apart from each other with a predetermined distance in an axis direction of the roll,
    wherein the two sealant outlets are formed inside the two projections respectively and along the circumference of the roll,
    wherein the step of dispensing the sealant to any one of the first and second substrates comprises:
    providing the sealant to the sealant dispensing apparatus;
    rolling the roll on the first or second substrates at a first direction; and
    rolling the roll on the first or second substrate at a second direction being perpendicular to the first direction;
    wherein the steps of rolling the roll on the first or second substrate at the first direction and the second direction respectively includes discharging the sealant through the sealant outlet by applying a pressure to the two sealant outlets with air or sealant.

2. The method of claim 1, further comprising:
    bonding the first and second substrates; and cutting the bonded first and second substrates into unit LCD panels.

3. The method of claim 2, wherein bonding the first and second substrates includes curing the sealant.

4. The method of claim 1, wherein the sealant outlet includes a continuous opening.

* * * * *